United States Patent
Yamasaki

(10) Patent No.: US 8,818,167 B2
(45) Date of Patent: Aug. 26, 2014

(54) RECEIVING APPARATUS, RECEIVING METHOD, AND PROGRAM

(71) Applicant: Sony Corporation, Tokyo (JP)

(72) Inventor: Yoko Yamasaki, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 13/747,635

(22) Filed: Jan. 23, 2013

(65) Prior Publication Data

US 2013/0195425 A1 Aug. 1, 2013

(30) Foreign Application Priority Data

Jan. 31, 2012 (JP) ................................. 2012-018829

(51) Int. Cl.
*H04N 9/80* (2006.01)

(52) U.S. Cl.
USPC ............................ 386/241; 386/239; 386/261

(58) Field of Classification Search
USPC ......................................... 386/239, 241, 261
See application file for complete search history.

(56) References Cited

U.S. PATENT DOCUMENTS

| 2003/0039271 | A1* | 2/2003 | Mizuno | 370/486 |
| 2003/0188307 | A1* | 10/2003 | Mizuno | 725/28 |
| 2004/0123327 | A1* | 6/2004 | Fai Ma et al. | 725/100 |
| 2007/0133607 | A1* | 6/2007 | Park | 370/484 |

FOREIGN PATENT DOCUMENTS

| EP | 1347642 A2 | 9/2003 |
| JP | 2002-335488 A | 11/2002 |

OTHER PUBLICATIONS

Communication from EP Application No. 13152510.7, dated Jun. 6, 2014.

* cited by examiner

*Primary Examiner* — Thai Tran
*Assistant Examiner* — Joseph Mesa
(74) *Attorney, Agent, or Firm* — Lerner, David, Littenberg, Krumholz & Mentlik, LLP

(57) ABSTRACT

Provided is a receiving apparatus, including: a stream receiver unit configured to receive a broadcast transport stream; a partial-transport-stream recorder configured to create a partial transport stream from the received broadcast transport stream, and to record the partial transport stream in a recording medium; an event generating section configured to generate an event, the event relating to the received broadcast transport stream; and a private-descriptor inserting section configured to create a private descriptor, the private descriptor being information on the generated event, and to insert the private descriptor in a section of the partial transport stream.

6 Claims, 10 Drawing Sheets

| Data structure | Number of bits |
|---|---|
| registration_descriptor () { | |
|     descriptor_tag | 8bit |
|     descriptor_length | 8bit |
|     format_identifier | 32bit |
|     for(i=0 ;i< N ; i++) { | |
|         additional_identification_info | 8bit |
|     } | |
| } | |

FIG.4

```
registration_descriptor() {
    descriptor_tag
    descriptor_length
    format_identifier
    additional_identification_info {
        sub_id    8bit
        if (sub_id == 0x01) {    // Parental Control
            parental_control_type
            if (parental_control_type == 0x01) { // CAM rating
                cam_id
                cam_parental_control_age
                cam_parental_control_private_data_length
                for (i = 0; i< N; ++i) {
                    cam_parental_control_private_data
                }
            } else {
                // not defined
            }
        } else if (sub_id == 0x02) { // User Event
            user_event_type
            if (user_event_type == 0x01) { // Bookmark
                user_event_id
                if (user_event_id == 0x01) { // Bookmark with text
                    bookmark_id
                    bookmark_text_data_length
                    for (j = 0; j< M; ++j) {
                        bookmark_text_data
                    }
                } else if (user_event_id == 0x02) { // Favorite
                    favorite_point_id
                } else {
                    // not defined
                }
            } else {
                // not defined
            }
        } else {
            // not defined
        }
    }
}
```

FIG.5

RECEIVING APPARATUS, RECEIVING METHOD, AND PROGRAM

CROSS-REFERENCE TO RELATED APPLICATION

The present application claims priority from Japanese Patent Application No. JP 2012-018829 filed in the Japanese Patent Office on Jan. 31, 2012, the entire content of which is incorporated herein by reference.

BACKGROUND

The present disclosure relates to a receiving apparatus configured to receive a broadcast transport stream, and to record a partial transport stream. The present disclosure further relates to such a receiving method and such a program.

Recently, BS digital broadcasting, broadband CS digital broadcasting, and digital terrestrial broadcasting (hereinafter, simply referred to as "digital broadcasting" arbitrarily) are offered. Digital broadcasting in Japan is in conformity with the ARIB (Association of Radio Industries and Businesses) standard. The ARIB standard is in conformity with European DVB (Digital Video Broadcasting) standard. According to the ARIB standard, images and sounds are broadcasted in conformity with the MPEG2-TS (Moving Picture Experts Group phase 2-Transport Stream) system.

An MPEG2-TS includes a packet of information, which is described in a PSI (Program Specific Information)/SI (Service Information) section-format table. PSI is necessary for a system, which selects a desired broadcasting channel and receives broadcasting signals. Examples of PSI include a PAT (Program Association Table), a PMT (Program Map Table), an NIT (Network Information Table), a CAT (Condition Access Table), and the like. A PID (Packet Identifier) of a PMT and other information are described in the PAT. The PID corresponds to a program number. PIDs of images, sounds, additional data, and a PCR (Program Clock Reference) are described in the PMT. The images, sounds, additional data, and PCR are included in a corresponding program. A carrier frequency, which sends a target program, is described in the NIT. An identification of a conditional access system and individual information are described in the CAT. Examples of the individual information include subscription information and the like. The SI is a section used for a service by a broadcasting organization.

Meanwhile, in the field of digital broadcasting, MPEG2-TS, which is compressed in conformity with the MPEG2 format and is a digital signal, is transmitted through a high-speed digital interface. The MPEG2-TS is recorded in a recording medium such as a Blu-ray Disc, for example, and is reproduced. In a case of recording a digital broadcast program, a partial transport stream (hereinafter, referred to as "partial TS") is recorded in a recording medium. The partial TS is obtained as follows. That is, some packets are extracted from an MPEG2-TS. The extracted packets form a program that a user wishes to record. A receiving apparatus constructs a partial TS by using the extracted packets.

In a partial TS, packets of audio, video, and data of a desired program, a packet of PAT and PMT sections, and a packet of an SIT (Selection Information Table) section and a DIT (Discontinuity Information Table) section are created.

Note that "DVB ETS 300 468 Specification for Service Information (SI) in DVB systems, ARIB-STD B1/B21, and ARIB TRB 15/TR B14" describes partial TS in detail.

SUMMARY

One system records and reproduces a partial TS. This system constructs tables in conformity with a standard. The system inserts descriptors in conformity with the standard in the tables. In this manner, the system records, reproduces, or sends information only in conformity with the standard. Another system receives the sent partial TS, and reproduces the recorded partial TS. This system interprets descriptors and tables only in conformity with the system standard. The system provides information to a user (see Japanese Patent Application Laid-open No. 2002-335488).

However, the standard provides no descriptor for describing an event, which does not originate from a broadcast transport stream, in a partial TS. One event, which does not originate from a broadcast transport stream, is a parental control by a conditional access module (CAM). Further, examples of an event, which does not originate from a broadcast transport stream, include various events. An example of such events is, for example, the following event. That is, a bookmark is set for a scene, which a user prefers, in a partial TS of a recorded program.

In view of the above-mentioned circumstances, it is desirable to provide a receiving apparatus configured to record an event, which does not originate from a broadcast transport stream, in a partial TS. It is also desirable to provide such a receiving method and such a program.

According to an embodiment of the present technology, there is provided a receiving apparatus, including: a stream receiver unit configured to receive a broadcast transport stream; a partial-transport-stream recorder configured to create a partial transport stream from the received broadcast transport stream, and to record the partial transport stream in a recording medium; an event generating section configured to generate an event, the event relating to the received broadcast transport stream; and a private-descriptor inserting section configured to create a private descriptor, the private descriptor being information on the generated event, and to insert the private descriptor in a section of the partial transport stream.

The event generating section may be a conditional access module, the event generating section being configured to generate the event in a case where the received broadcast transport stream is parental-controlled, and the private-descriptor inserting section may be configured to create the private descriptor, information on the event being stored in the private descriptor, the information on the event being information on a parental control of the parental-controlled broadcast transport stream.

The receiving apparatus according may further include a reproduction controller configured to output information on the parental control to the conditional access module, the parental control being detected when reproducing the partial transport stream recorded in the recording medium.

The event generating section may be an input unit, the input unit being configured to receive an instruction to add a bookmark to the received and reproduced broadcast transport stream from a user, the event generating section being configured to generate the event when receiving the instruction to add a bookmark, and the private-descriptor inserting section may be configured to create the private descriptor, information on the event being stored in the private descriptor, the information on the event being information on the added bookmark.

The reproduction controller may be configured to search the partial transport stream for a desired bookmark by using a key selected by a user.

The private-descriptor inserting section may be configured to record an entity of the information on the event in the recording medium, and to store reference information in the private descriptor, the reference information being used to refer to an entity of the information on the event.

According to an embodiment of the present technology, there is provided a receiving method, including: receiving, by a stream receiver unit, a broadcast transport stream; generating, by an event generating section, an event, the event relating to the received broadcast transport stream to be reproduced; creating, by a partial-transport-stream recorder, a partial transport stream from the broadcast transport stream, and recording the partial transport stream in a recording medium; and creating, by a private-descriptor inserting section, a private descriptor, information on the generated event being stored in the private descriptor, and inserting the private descriptor in a section of the partial transport stream, the partial transport stream being recorded in the recording medium.

According to an embodiment of the present technology, there is provided a program, causing a computer to function as: a stream receiver unit configured to receive a broadcast transport stream; a partial-transport-stream recorder configured to create a partial transport stream from the received broadcast transport stream, and to record the partial transport stream in a recording medium; and a private-descriptor inserting section configured to create a private descriptor, the private descriptor being information on an event generated by an event generating section, the event generating section being configured to generating an event, the event relating to the received broadcast transport stream, and to insert the private descriptor in a section of the partial transport stream.

As described above, according to the present technology, an event, which does not originate from a broadcast transport stream, may be recorded in a partial TS.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 4 is a diagram showing the format of an MPEG registration descriptor;

FIG. 5 is a diagram showing an example in which parental-control information and bookmark information are stored in the registration descriptor of FIG. 4;

DETAILED DESCRIPTION OF EMBODIMENTS

Hereinafter, an embodiment of the present disclosure will be described with reference to the drawings.

First Embodiment

This embodiment relates to a receiving apparatus configured to receive a broadcast transport stream (TS), to create a partial TS, to record the partial TS in a recording medium, and to reproduce the partial TS.

[Structure of Receiving Apparatus]

Figure 1:
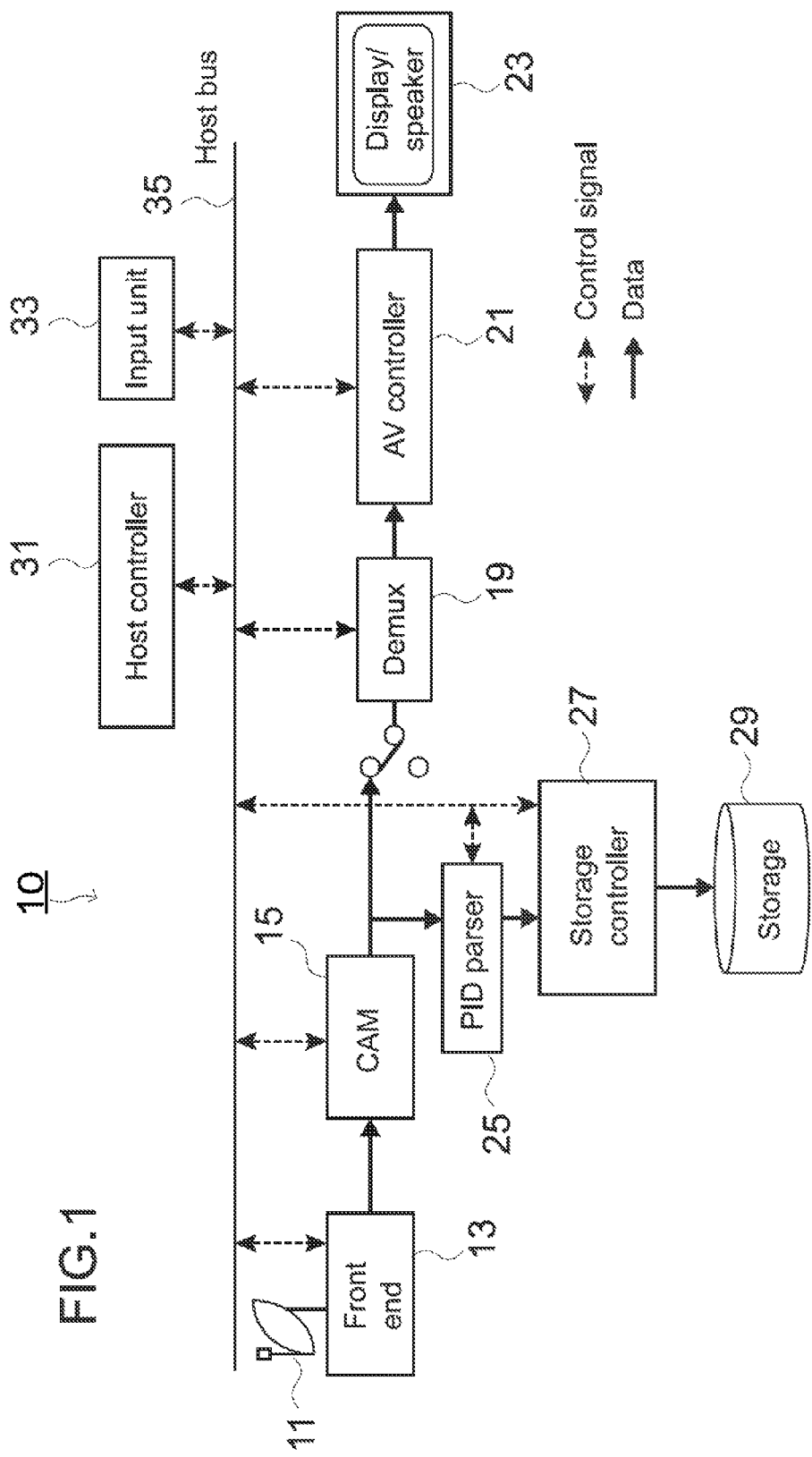
FIG. 1 is a block diagram showing the structure of a receiving apparatus according to a first embodiment of the present technology.

FIG. 1 is a block diagram showing a structure of a receiving apparatus according to the first embodiment of the present technology.

A receiving apparatus 10 includes a receiving antenna 11, a front end 13, a CAM 15, a demultiplexer (Demux) 19, an AV controller 21, a display/speaker 23, a PID parser 25, a storage controller 27, storage 29, a host controller 31, an input unit 33, and a host bus 35.

The receiving antenna 11 receives digital broadcast waves. Examples of digital broadcasting include, for example, BS digital broadcasting, broadband CS digital broadcasting, digital terrestrial broadcasting, and the like.

The front end 13 includes a tuner circuit and a demodulating circuit. The tuner circuit selects a broadcast signal having a desired carrier frequency from received broadcast signals based on a control signal the host controller 31. The tuner circuit supplies the selected broadcast signal to the demodulating circuit. The demodulating circuit demodulates the broadcast signal selected by the tuner circuit. Examples of demodulation include, for example, BPSK (Binary Phase Shift Keying), QPSK (Quadrature Phase Shift Keying), TC-8PSK (Trellis 8PSK), and the like.

The receiving antenna 11 and the front end 13 function as a stream receiver unit. The stream receiver unit receives a broadcast transport stream.

The conditional access module (CAM) 15 descrambles and decodes signals. The CAM 15 carries out copy protection, parental controls, restrictions of pay-per-view access, and the like. Specifically, the CAM 15 descrambles a broadcast transport stream (TS). In the broadcast transport stream (TS), video information, audio information, and other information are multiplexed. The CAM 15 supplies the descrambled broadcast transport stream to the demultiplexer 19 and the PID parser 25. The conditional access module 15 functions as an event generating section.

The demultiplexer 19 demultiplexes the multiplexed broadcast transport stream based on packet identifiers (PIDs), to thereby obtain packets of video stream, packets of audio stream, and packets of other information (PSI/SI: Program Specific Information/Service Information). The packet identifiers (PIDs) are described in headers of the packets, respectively. The demultiplexer 19 supplies the obtained video stream and audio stream to the AV controller 21. Further, the demultiplexer 19 supplies the obtained information packets to the host controller 31.

The AV controller 21 includes a video decoder and an audio decoder. The video decoder decodes video streams. The audio decoder decodes the audio streams. The video decoder decodes video streams, and supplies obtained video signals to a display of the display/speaker 23. The audio decoder decodes audio streams, and supplies obtained audio signals to a speaker of the display/speaker 23.

The display/speaker 23 includes a display and a speaker. The display of the display/speaker 23 displays reproduced videos, user menus, various lists, a password entry window for setting and canceling parental controls, and the like. The speaker of the display/speaker 23 outputs reproduced audio signals as audible sounds.

The PID parser 25 selects packets from a broadcast transport stream supplied from the conditional access module 15. The selected packets are used to form a partial TS of a program, which is determined by the host controller 31. The PID parser 25 supplies the selected packets to the storage controller 27 (partial-transport-stream recorder).

The host controller 31 includes a CPU (Central Processing Unit), a ROM (Read Only Memory), a RAM (Random Access Memory), and the like. The ROM of the host controller 31 is a fixed memory. Programs carried out by the CPU and data are stored in the ROM. The RAM is a main memory for the CPU.

Figure 3:
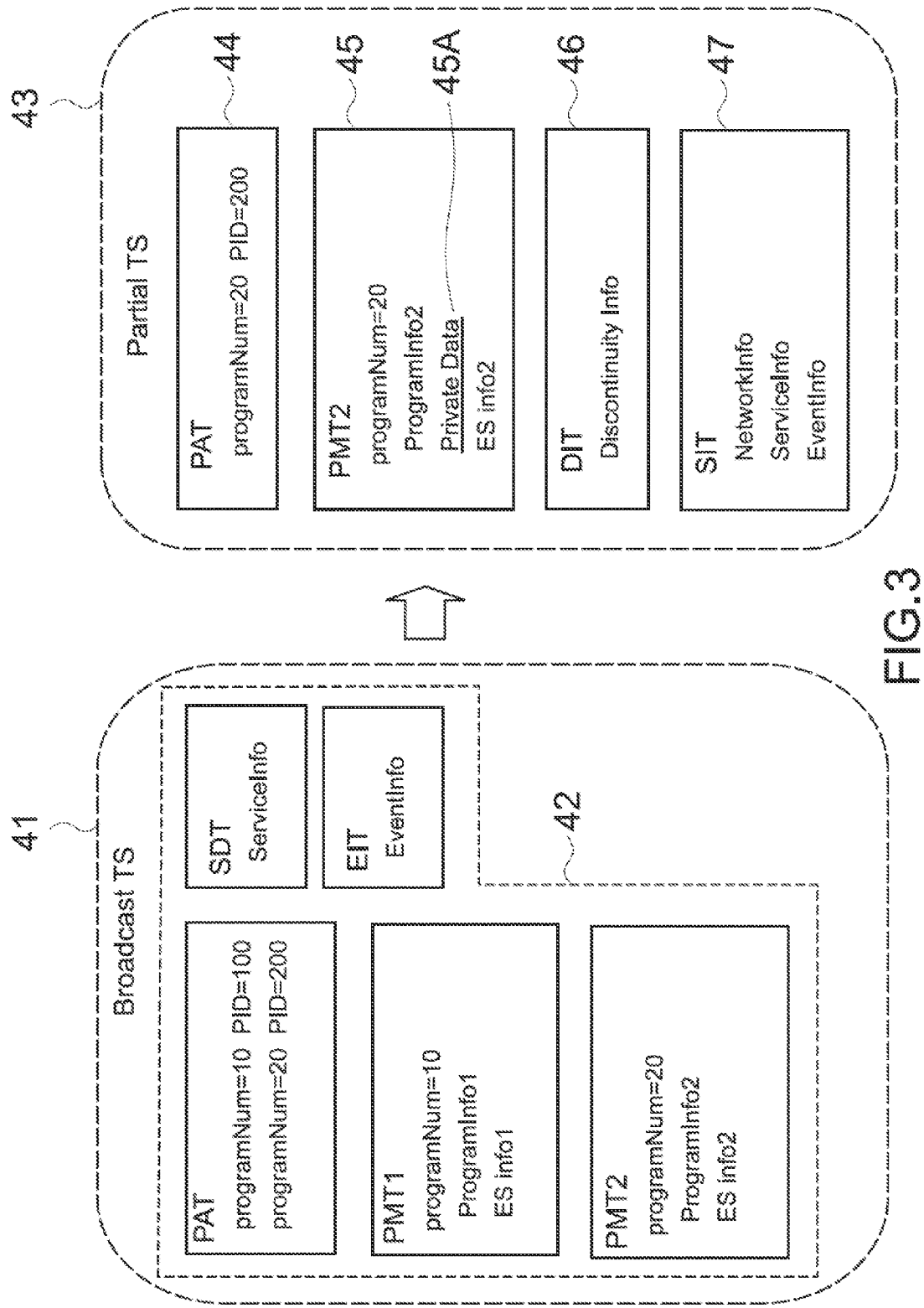
FIG. 3 is a diagram showing how to create a PAT, a PMT, a DIT, and an SIT when recording a partial TS.

As shown in FIG. 3, the host controller 31 creates a PAT (Program Association Table) 44, a PMT (Program Map Table) 45, a DIT (Discontinuity Information Table) 46, and an SIT (Selection Information Table) 47 based on a PSI/SI (Program Specific Information/Service Information) 42, in order to form a partial TS. The PSI/SI 42 is separated from a broadcast transport stream 41. The PAT 44, the PMT 45, the DIT 46, and the SIT 47 are to be used to create a partial TS 43. The host controller 31 supplies the PAT 44, the PMT 45, the DIT 46, and the SIT 47 to the storage controller 27.

Note that FIG. 3 shows a case where the partial TS 43 of a program (ProgramNum=20) is created based on PSI (Program Specific Information) and SI (Service Information). The PSI and SI are inserted in the broadcast transport stream 41.

Here, the PAT 44 specifies the packet identifier (PID) of a TS packet, which transmits the PMT 45. The PMT 45 relates to the partial TS 43.

The PMT 45 specifies packet identifiers of TS packets, which transmit encoded signals of a program.

The DIT 46 indicates a changing point, at which service information of a program transmitted by a partial TS may be discontinuous.

The SIT 47 indicates information on a program transmitted by a partial TS.

The storage controller 27 inserts the PAT, the PMT, the DIT, and the SIT, which are supplied from the host controller 31, in packets supplied from the PID parser 25. In this manner, the storage controller 27 creates a partial TS. The storage controller 27 records the partial TS in the storage 29.

A partial TS is recorded in the storage 29, and is read from the storage 29. Specifically, the storage 29 is a recording medium such as an HDD (Hard disc Drive) or Blu-ray Disc.

The input unit 33 processes a key-input from operation buttons. A user operates the input unit 33, to thereby select options from menus, select options from various lists, enter a password for setting and canceling parental controls, set bookmarks, select bookmarks to be searched for, and the like.

Figure 2:
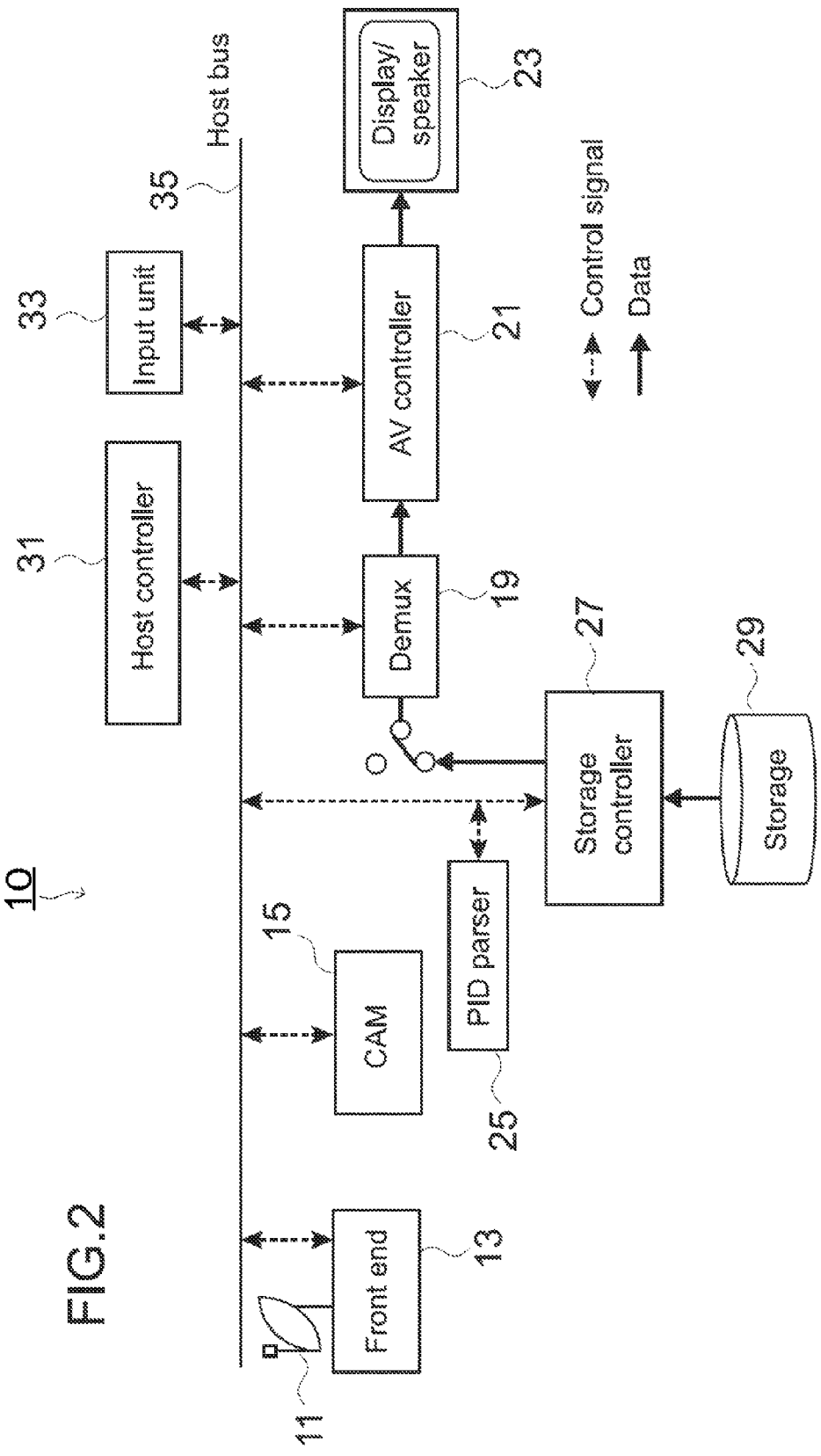
FIG. 2 is a diagram showing the state where the receiving apparatus of FIG. 1 reproduces a partial TS.

The receiving apparatus 10 reproduces a partial TS recorded in the storage 29. In this case, as shown in FIG. 2, the storage controller 27 reads a partial TS from the storage 29, and supplies the read partial TS to the demultiplexer 19. The demultiplexer 19 demultiplexes the partial TS to obtain a video stream and an audio stream, and supplies the obtained video stream and audio stream to the AV controller 21. In addition, the demultiplexer 19 supplies the PAT, the PMT, the DIT, and the SIT to the host controller 31. The host controller 31 interprets the PAT, the PMT, the DIT, and the SIT. As a result, images and sounds of a program is provided to the display/speaker 23.

[Outline of Typical Receiving Apparatus]

One system records and reproduces a partial TS. This system constructs tables in conformity with a standard. The system inserts descriptors in conformity with the standard in the tables. In this manner, the system records, reproduces, or sends information only in conformity with the standard. Another system receives the sent partial TS, and reproduces the recorded partial TS. This system interprets descriptors and tables only in conformity with the system standard. The system provides information to a user.

However, the standard provides no descriptor for describing an event, which does not originate from a broadcast transport stream, in a partial TS.

One event, which does not originate from a broadcast transport stream, is a parental control by the conditional access module 15.

That is, in BS digital broadcasting, CS digital broadcasting, and European digital terrestrial broadcasting, parental-control rating information (parental rating) is set according to content of a program. The conditional access module 15 compares rating information (parental rating) of a program with a parental level (minimum age). The rating information (parental rating) is described in PSI/SI. The parental level (minimum age) is set in the receiving apparatus 10 by a user. In a case where the rating information (parental rating) is larger than the parental level (minimum age), the conditional access module 15 determines that the program is a parental-control target. The conditional access module 15 requests a user to enter a password (passcode). The conditional access module 15 compares the entered password with a password, which is preset in the receiving apparatus 10 by a user. The conditional access module 15 allows the user to watch the parental-control target program, only in a case where the entered password coincides with the preset password.

The standard defines no descriptor for embedding rating information (parental rating), which originates from the conditional access module, in a partial TS. Because of this, parental controls are not carried out based on rating information when reproducing a partial TS.

Further, examples of an event, which does not originate from a broadcast transport stream, include various events originating from user operations. An example of such events is, for example, the following event. That is, bookmark information is set for an arbitrary scene, which is specified by a user, in a partial TS of a recorded program.

According to this embodiment, as shown in FIG. 3 for example, a private descriptor (Private Data) 45A is inserted in a section such as a program descriptor area of a PMT, for example. The private descriptor (Private Data) 45A is information on an event, which is not described by using a descriptor in conformity with a partial TS standard or a broadcasting standard. Such an event is generated in relation to a received broadcast transport stream. Examples of information on such an event include parental-control information, bookmark information, and other information, which are created by the conditional access module.

For example, an MPEG registration descriptor may be used as the private descriptor. Another descriptor may also be used as the private descriptor.

FIG. 4 is a diagram showing a format of the MPEG registration descriptor.

The registration descriptor includes a descriptor tag (descriptor_tag), a descriptor length (descriptor_length), a format identifier (format identifier), additional identification information (additional_identification_info), and the like. Here, the additional identification information (additional_identification_info) is defined by a user, who obtains a format identifier.

Information on an event, which is not described by a descriptor in conformity to a partial TS standard or a broadcasting standard, may be stored in the additional identification information (additional_identification_info) field. Examples of such information include, for example, parental-control information, bookmark information, and the like.

FIG. 5 shows an example in which parental-control information 51 and bookmark information 52 are stored in an additional identification information (additional_identification_info) field of a registration descriptor 48.

In the parental-control information 51, a conditional-access-module identifier (cam_id) is identification information, which is previously given to the conditional access module 15.

Rating information (cam_parental_control_age) is a value (parental rating), which corresponds to age limit for watching a program.

A private data length (cam_parental_control_private_data_length) is the length of private data.

Parental-control data (cam_parental_control_private_data) is control data of a parental control, which the conditional access module 15 carries out.

In the bookmark information 52, a bookmark identifier (bookmark_id) is a serial number given to a bookmark.

Bookmark data (bookmark_text_data) is a fixed tag, which defines the bookmark.

A bookmark-location identifier (favorite_point_id) is a serial number, which indicates the location of the bookmark.

[How to Record Partial TS]

Next, how to record a partial TS will be described.

Figure 6:
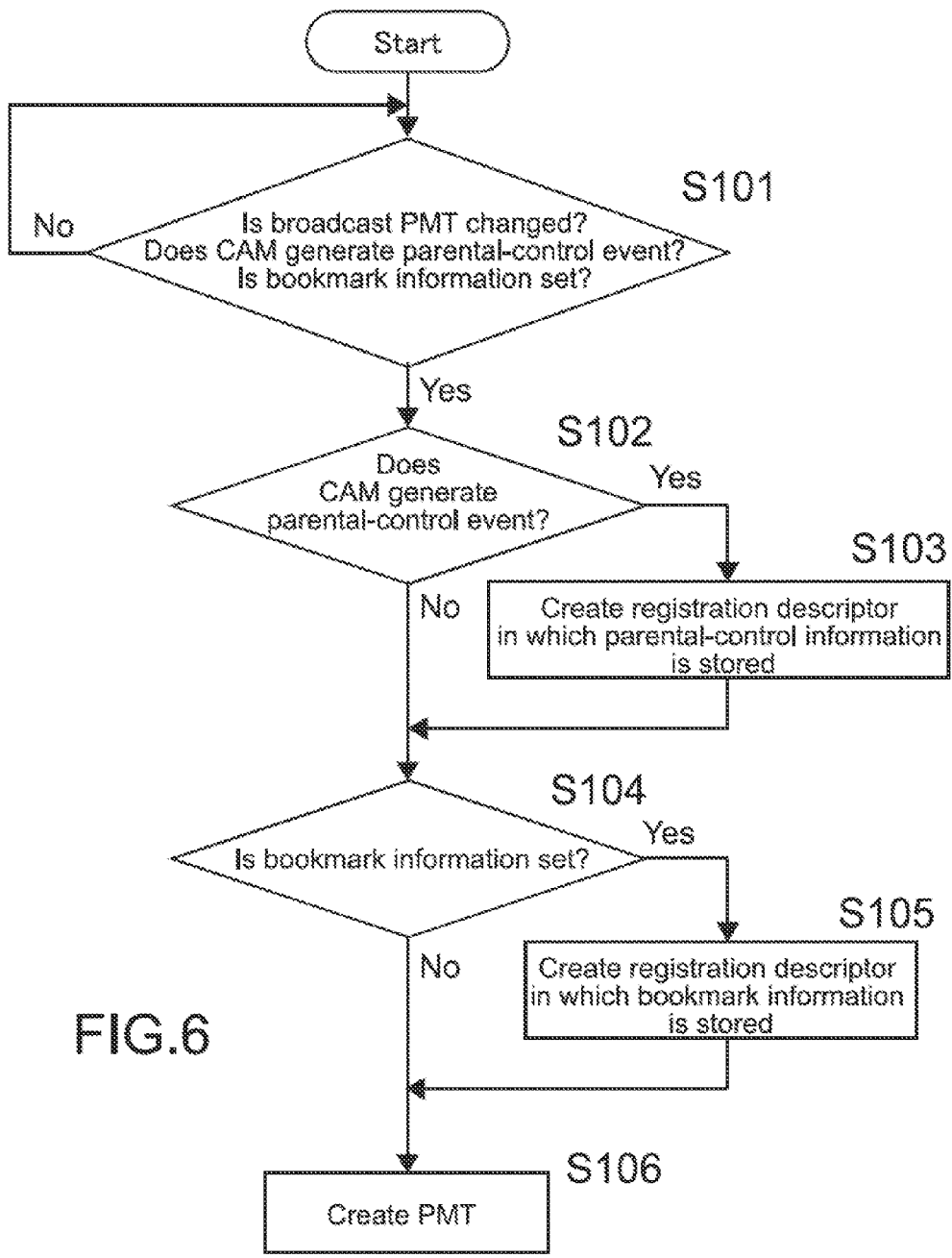
FIG. 6 is a flowchart showing how the receiving apparatus of FIG. 1 records a partial TS.

FIG. 6 is a flowchart showing how to record a partial TS.

The host controller 31 of the receiving apparatus 10 analyzes PSI/SI, which is obtained from the demultiplexer 19. The host controller 31 detects that a PMT is changed, that the conditional access module 15 generates a parental-control event, or that the input unit 33 is operated and bookmark information is set (Step S101). Then, the host controller 31 creates a PMT for a partial TS (Step S106).

The conditional access module 15 (event generating section) issues the parental-control event, in a case where it is determined that the program is a parental-control target.

Here, the host controller 31 detects that the conditional access module 15 generates a parental-control event in Step S101 (Step S102, YES). In this case, the host controller 31 (private-descriptor inserting section) creates a registration descriptor (Step S103). In the registration descriptor, parental-control information is stored. Examples of the parental-control information include a conditional-access-module identifier, rating information, and the like. The parental-control information is included in a parental-control event, which is supplied from the conditional access module 15. The host controller 31 (private-descriptor inserting section) inserts the created registration descriptor in a section of a PMT or the like of a partial TS (Step S106).

Further, the host controller 31 detects that the input unit 33 (event generating section) is operated by a user and bookmark information is set in Step S101 (Step S104, YES). In this case, the host controller 31 (private-descriptor inserting section) behaves as follows. The host controller 31 (private-descriptor inserting section) creates a registration descriptor (Step S105). In the registration descriptor, bookmark information is stored. The bookmark information is created when the bookmark is set. Examples of the bookmark information include a bookmark identifier (bookmark_id), bookmark data (bookmark_text_data), a bookmark-location identifier (favorite_point_id), and the like. The host controller 31 (private-descriptor inserting section) inserts the created registration descriptor in the PMT of the partial TS (Step S106).

In this manner, information on an event, which is not described by using a descriptor in conformity with a partial TS standard or a broadcasting standard, is described in a PMT. Such an event is generated in relation to a received broadcast transport stream. Examples of information on such an event include parental-control information, bookmark information, and other information.

Figure 7:
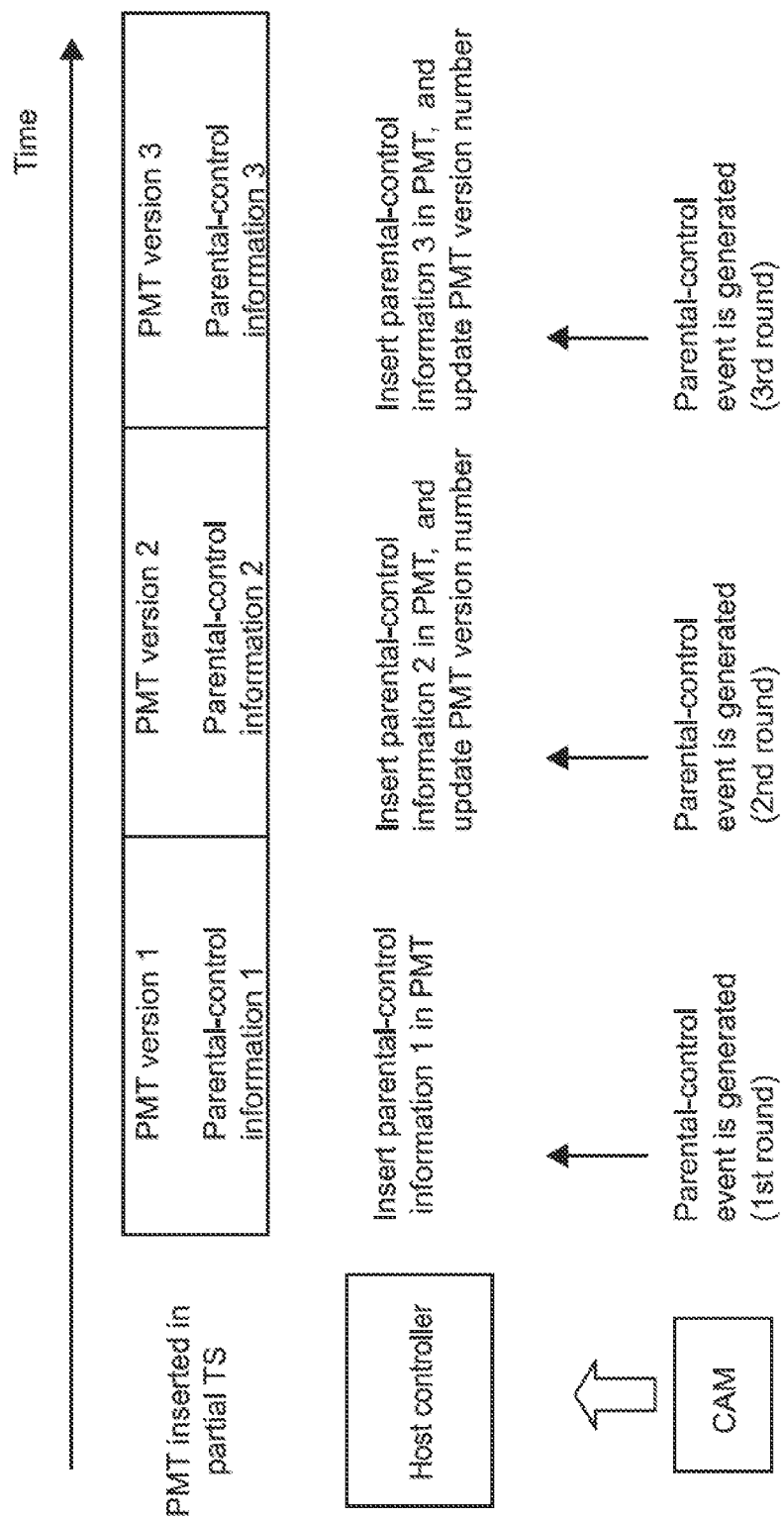
FIG. 7 is a diagram showing an example of how to record a PMT in a case where three parental-control events are generated when recording a partial TS.

FIG. 7 is a diagram showing an example of how to record a PMT in a case where three parental-control events are generated when recording a partial TS.

Parental-control information such as rating information may change over time. The host controller 31 updates the version number of a PMT every time parental-control information changes. The parental-control information is included in a parental-control event supplied from the conditional access module 15. A registration descriptor, in which the changed parental-control information is stored, is inserted in the updated PMT. That is, when reproducing a partial TS, the host controller 31 is capable of recognizing the PMT, which includes the changed parental-control information, with reference to the version number.

[How to Reproduce Partial TS]

Figure 8:
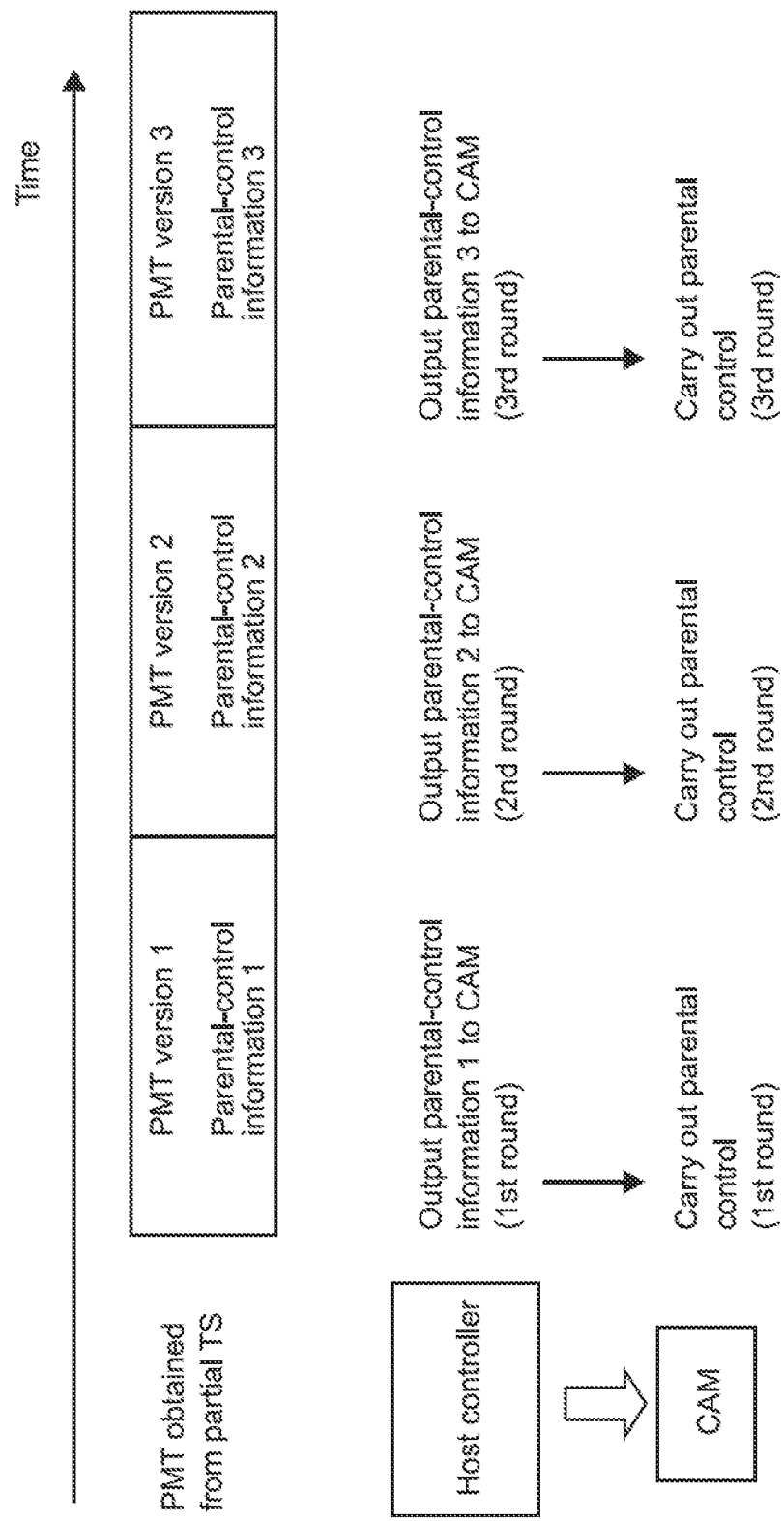
FIG. 8 is a diagram showing how to reproduce a partial TS, which corresponds to the example of how to record a PMT shown in FIG. 7.

FIG. 8 is a diagram showing how to reproduce a partial TS. FIG. 8 corresponds to the example of how to record a PMT shown in FIG. 7.

When reproducing a partial TS, the host controller 31 detects the first parental-control information in a PMT. Alternatively, the host controller 31 detects parental-control information, which includes an updated PMT version number. Then, the host controller 31 outputs the parental-control information to the conditional access module 15 via the host bus 35 (reproduction controller). The conditional access module 15 carries out parental controls based on parental-control information and a parental level, similar to the case where the conditional access module 15 detects parental-control information in a broadcast transport stream. The parental-control information is supplied from the host controller 31. The parental level is set in the receiving apparatus 10 by a user. As a result, it is possible to carry out parental controls based on rating information when reproducing a partial TS.

[Processing using Bookmark Information in Partial TS]

The host controller 31 carries out processing by using bookmark information in a partial TS in response to an instruction input from the input unit 33 by a user (reproduction controller).

Examples of the processing using bookmark information in a partial TS include:
  1. to display a list of bookmark information; and
  2. to select/move a reproduction position based on bookmark information.

[How to Update Information on Event Inserted in PMT of Partial TS]

According to the partial TS standard, data recorded in a PMT is fixed when creating a partial TS. After that, the data recorded in the PMT is not changed. For example, it is desired to provide a scheme in which bookmark information and other information may be changed after a partial TS is created, in order to increased quality of bookmark service.

In view of this, there will be described a scheme in which information inserted in a PMT may be changed after a partial TS is created. The information is inserted in a PMT as a private descriptor. Examples of the private descriptor include an MPEG registration descriptor and the like.

Figure 9:
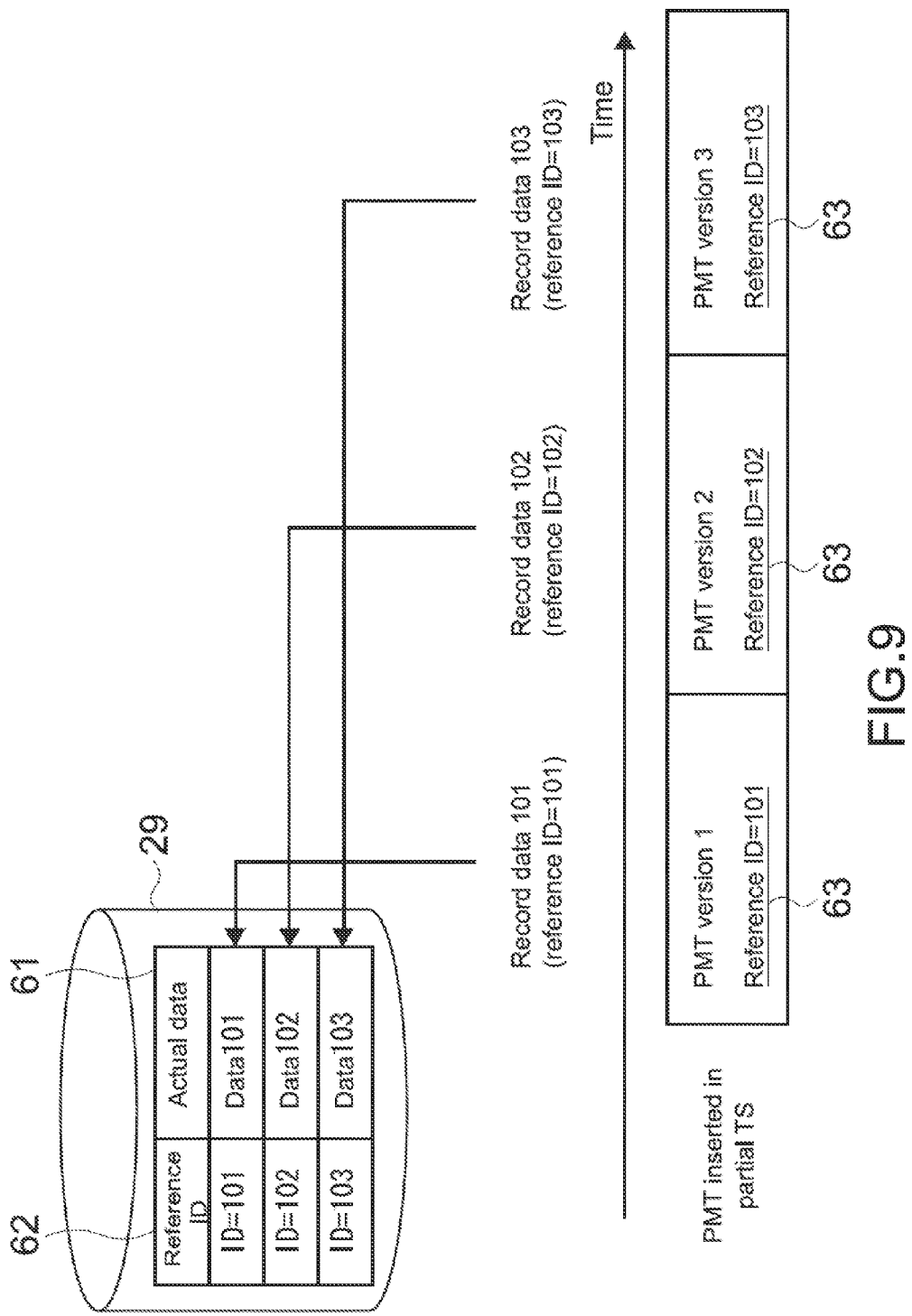
FIG. 9 is a diagram for explaining a scheme capable of updating information on an event, which is inserted in a PMT of a partial TS.
Figure 10:
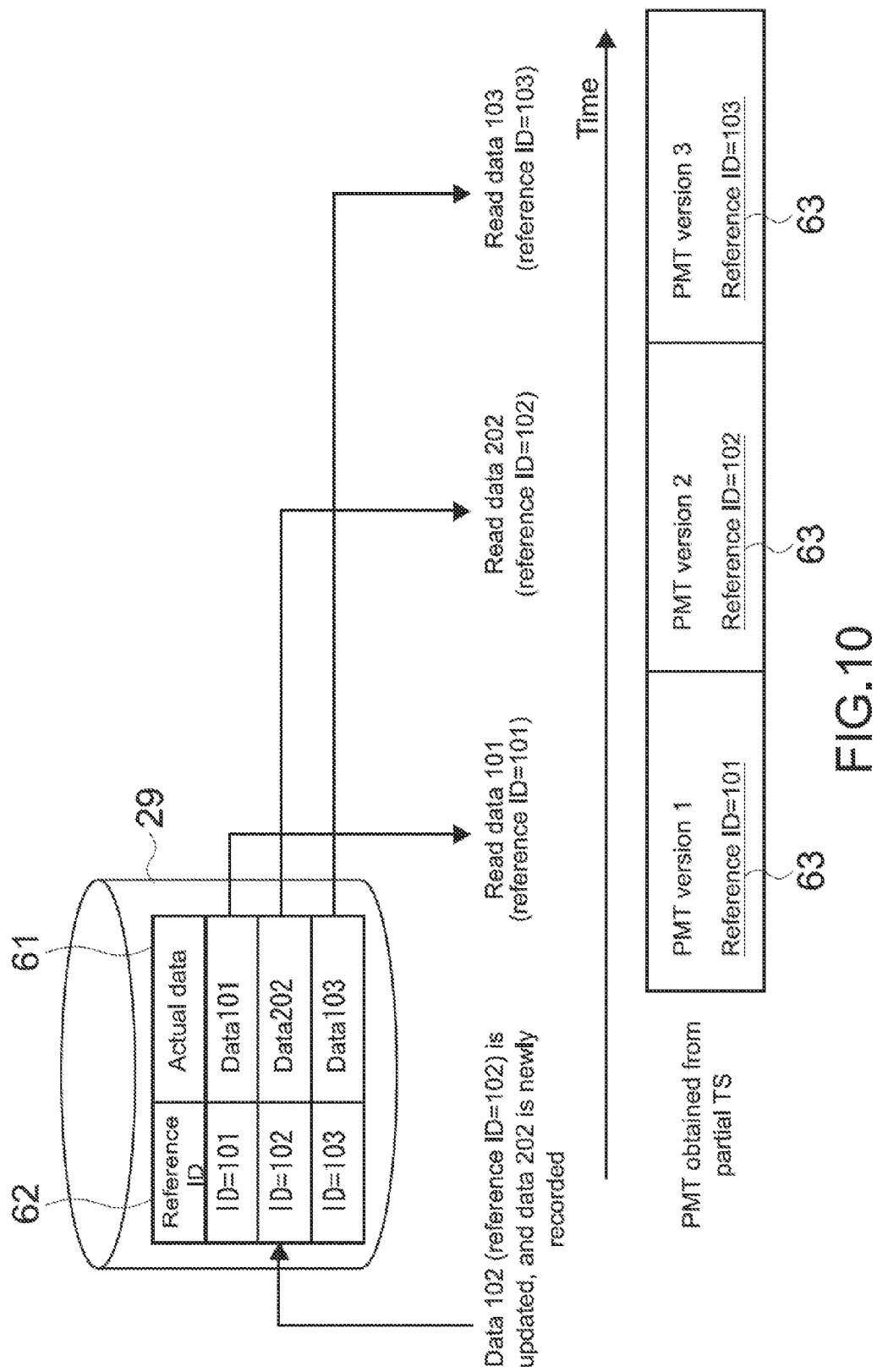
FIG. 10 is a diagram for explaining an example of updating information on an event, which is inserted in a PMT of a partial TS.

FIG. 9 and FIG. 10 are diagrams for explaining the scheme.

The host controller 31 records actual data 61 in a recording medium such as, for example, the storage 29. The actual data 61 is apart from a partial TS in the recording medium. The actual data 61 is the entity of information on an event. In this case, the host controller 31 records the actual data 61 in relation to a reference ID 62. Note that the actual data 61 may be recorded in relation to the reference ID 62 in a RAM in the host controller 31. Alternatively, the actual data 61 may be recorded in storage other than the storage 29 in which a partial TS is recorded.

The host controller 31 provides a user interface. A user operates the display of the display/speaker 23, the input unit 33, and the like. As a result, the actual data 61 of information on an event recorded in the recording medium is updated. A user specifies the individual actual data 61 by using the user interface provided by the host controller 31. As a result, content of the actual data 61 is updated, and arbitrary content is newly recorded. In this case, the correspondence relation between the actual data 61 and the reference ID 62 is maintained. FIG. 10 shows an example in which content "data 102" of the actual data 61 (reference ID=102) is updated, and content "data 202" is newly recorded.

In this manner, the actual data 61 is updated. Even in this case, the correspondence relation between the actual data 61 and the reference ID 62 is maintained. Because of this, the host controller 31 is capable of obtaining the corresponding updated actual data 61 from the recording medium with reference to a reference ID 63. The reference ID 63 is inserted in the PMT of a partial TS.

According to this scheme, information inserted in a PMT may be changed after a partial TS is created. The information is inserted in a PMT as a private descriptor. Examples of the private descriptor include an MPEG registration descriptor and the like.

Note that, according to this embodiment, an MPEG registration descriptor is described as an example of a private descriptor inserted in a PMT. However, in the present technology, the private descriptor inserted in a PMT is not limited to the MPEG registration descriptor.

Further, according to this embodiment, a private descriptor is inserted in a PMT of a partial TS. Alternatively, a private descriptor may be inserted in another section such as an SIT, for example.

It should be understood by those skilled in the art that various modifications, combinations, sub-combinations and alterations may occur depending on design requirements and other factors insofar as they are within the scope of the appended claims or the equivalents thereof.

Note that the present technology may employ the following configurations.

(1) A receiving apparatus, comprising:
a stream receiver unit configured to receive a broadcast transport stream;
a partial-transport-stream recorder configured
to create a partial transport stream from the received broadcast transport stream, and
to record the partial transport stream in a recording medium;
an event generating section configured to generate an event, the event relating to the received broadcast transport stream; and
a private-descriptor inserting section configured
to create a private descriptor, the private descriptor being information on the generated event, and
to insert the private descriptor in a section of the partial transport stream.

(2) The receiving apparatus according to (1), wherein
the event generating section is a conditional access module, the event generating section being configured to generate the event in a case where the received broadcast transport stream is parental-controlled,
the private-descriptor inserting section is configured to create the private descriptor, information on the event being stored in the private descriptor, the information on the event being information on a parental control of the parental-controlled broadcast transport stream.

(3) The receiving apparatus according to (2), further comprising
a reproduction controller configured to output information on the parental control to the conditional access module, the parental control being detected when reproducing the partial transport stream recorded in the recording medium.

(4) The receiving apparatus according to (1), wherein
the event generating section is an input unit, the input unit being configured to receive an instruction to add a bookmark to the received and reproduced broadcast transport stream from a user, the event generating section being configured to generate the event when receiving the instruction to add a bookmark, and
the private-descriptor inserting section is configured to create the private descriptor, information on the event being stored in the private descriptor, the information on the event being information on the added bookmark.

(5) The receiving apparatus according to any one of (1) to (4), wherein
the private-descriptor inserting section is configured
to record an entity of the information on the event in the recording medium, and
to store reference information in the private descriptor, the reference information being used to refer to an entity of the information on the event.

What is claimed is:

1. A receiving apparatus, comprising:
a stream receiver unit configured to receive a broadcast transport stream;
a partial-transport-stream recorder configured
to create a partial transport stream from the received broadcast transport stream, and
to record the partial transport stream in a recording medium;
an event generating section configured to generate an event, the event relating to the received broadcast transport stream and the event being one of a number of events; and
a private-descriptor inserting section configured
to create a private descriptor, the private descriptor being information on the generated event, and
to insert the private descriptor in a section of the partial transport stream,
in which one said event pertains to a bookmark specified by a user, and
in which the private-descriptor inserting section is configured to create a respective private descriptor being bookmark information on the specified bookmark and to enable the bookmark information to be changed after creation of the partial transport stream.

2. The receiving apparatus according to claim 1, wherein
the event generating section is a conditional access module, the event generating section being configured to generate the event in a case where the received broadcast transport stream is parental-controlled, and
the private-descriptor inserting section is configured to create the private descriptor, information on the event being stored in the private descriptor, the information on the event being information on a parental control of the parental-controlled broadcast transport stream.

3. The receiving apparatus according to claim 2, further comprising
a reproduction controller configured to output information on the parental control to the conditional access module, the parental control being detected when reproducing the partial transport stream recorded in the recording medium.

4. The receiving apparatus according to claim 1, wherein the private-descriptor inserting section is configured
to record an entity of the information on the event in the recording medium, and
to store reference information in the private descriptor, the reference information being used to refer to an entity of the information on the event.

5. A receiving method, comprising:
receiving, by a stream receiver unit, a broadcast transport stream;
generating, by an event generating section, an event, the event relating to the received broadcast transport stream to be reproduced and the event being one of a number of events;
creating, by a partial-transport-stream recorder, a partial transport stream from the broadcast transport stream, and recording the partial transport stream in a recording medium; and
creating, by a private-descriptor inserting section, a private descriptor, information on the generated event being stored in the private descriptor, and inserting the private descriptor in a section of the partial transport stream, the partial transport stream being recorded in the recording medium,
in which one said event pertains to a bookmark specified by a user, and
in which the private-descriptor inserting section is configured to create a respective private descriptor being bookmark information on the specified bookmark and to enable the bookmark information to be changed after creation of the partial transport stream.

6. A non-transitory computer readable memory having stored thereon a program, causing a computer to function as:
a stream receiver unit configured to receive a broadcast transport stream;
a partial-transport-stream recorder configured
to create a partial transport stream from the received broadcast transport stream, and
to record the partial transport stream in a recording medium; and
a private-descriptor inserting section configured
to create a private descriptor, the private descriptor being information on an event generated by an event generating section, the event generating section being configured to generating an event, the event relating to the received broadcast transport stream and the event being one of a number of events, and
to insert the private descriptor in a section of the partial transport stream,
in which one said event pertains to a bookmark specified by a user, and
in which the private-descriptor inserting section is configured to create a respective private descriptor being bookmark information on the specified bookmark and to enable the bookmark information to be changed after creation of the partial transport stream.

* * * * *